United States Patent
Seo et al.

(10) Patent No.: US 11,674,061 B2
(45) Date of Patent: Jun. 13, 2023

(54) SUBSTRATE-FREE ADHESIVE TAPE

(71) Applicant: LG Chem, Ltd., Seoul (KR)

(72) Inventors: Ki Seung Seo, Daejeon (KR); Ji Hye Kim, Daejeon (KR); Sang Hwan Kim, Daejeon (KR); Jun Hyoung Park, Daejeon (KR); Kyung Jun Yoon, Daejeon (KR)

(73) Assignee: LG Chem, Ltd.

( * ) Notice: Subject to any disclaimer, the term of this patent is extended or adjusted under 35 U.S.C. 154(b) by 141 days.

(21) Appl. No.: 16/979,377

(22) PCT Filed: Aug. 6, 2019

(86) PCT No.: PCT/KR2019/009815
§ 371 (c)(1),
(2) Date: Sep. 9, 2020

(87) PCT Pub. No.: WO2020/032548
PCT Pub. Date: Feb. 13, 2020

(65) Prior Publication Data
US 2021/0002524 A1    Jan. 7, 2021

(30) Foreign Application Priority Data
Aug. 8, 2018  (KR) .................. 10-2018-0092584
Aug. 2, 2019  (KR) .................. 10-2019-0094499

(51) Int. Cl.
*C09J 133/08* (2006.01)
*C09J 7/40* (2018.01)
*C09J 133/10* (2006.01)
*C09J 133/14* (2006.01)

(52) U.S. Cl.
CPC ............ *C09J 133/08* (2013.01); *C09J 7/405* (2018.01); *C09J 133/10* (2013.01); *C09J 133/14* (2013.01); *C09J 2203/318* (2013.01); *C09J 2203/326* (2013.01); *C09J 2301/122* (2020.08); *C09J 2301/308* (2020.08); *C09J 2433/00* (2013.01); *C09J 2483/005* (2013.01); *Y10T 428/2891* (2015.01)

(58) Field of Classification Search
None
See application file for complete search history.

(56) References Cited

U.S. PATENT DOCUMENTS

| 6,228,965 B1* | 5/2001 | Muta ..................... C09J 9/00 428/476.3 |
| 9,695,343 B2 | 7/2017 | Satrijo et al. |
| 11,427,736 B2 | 8/2022 | Kim et al. |
| 2013/0184393 A1 | 7/2013 | Satrijo et al. |
| 2013/0224436 A1* | 8/2013 | Kim ..................... C09J 4/00 428/141 |
| 2014/0178608 A1* | 6/2014 | Yoon ..................... G02B 5/30 428/1.55 |
| 2015/0205025 A1 | 7/2015 | Park et al. |
| 2016/0096980 A1 | 4/2016 | Wieneke et al. |
| 2017/0166786 A1 | 6/2017 | Moon et al. |
| 2017/0253770 A1 | 9/2017 | Nam et al. |
| 2021/0214591 A1* | 7/2021 | Kim ................. C08F 220/1808 |

FOREIGN PATENT DOCUMENTS

| CN | 103764777 A | 4/2014 |
| JP | 2011162593 A | 8/2011 |
| JP | 2013540181 A | 10/2013 |
| JP | 5912772 B2 | 4/2016 |
| KR | 20150120292 A | 10/2015 |
| KR | 20160010545 A | 1/2016 |
| KR | 20160027501 A | 3/2016 |
| KR | 20160035704 A | 4/2016 |
| KR | 20170062370 A | 6/2017 |
| KR | 20170115197 A | 10/2017 |
| TW | 201546229 A | 12/2015 |
| WO | 2013028047 A2 | 2/2013 |

OTHER PUBLICATIONS

Brochure of tesa 7475 tape, "tesa ® 7475 PV2", retrieved on Mar. 5, 2023 (Year: 2023).*
International Search Report for PCT/KR2019/009815 dated Dec. 2, 2019; 4 pages.
R A Roberts:"Project PAJ1: Failure criteria and their application to Visco-Elastic/Visco-Plastic materials: Review Of Methods For The Measurement Of Tack", Sep. 1, 1997 (Sep. 1, 1997). pp. 1-11, XP055769369. Retrieved from the Internet: URL:http://citenpl. internal.epo.orgjwfjwebjcitenpljcitenpl.html [retrieved on Jan. 27, 2021].
Extended European Search Report including Written Opinion for EP19847057.7 dated Feb. 11, 2021; 8 pages.

* cited by examiner

Primary Examiner — Anish P Desai
(74) Attorney, Agent, or Firm — Lerner David LLP

(57) ABSTRACT

A substrate-free adhesive tape that is excellent in adhesive physical properties and is suitable for a continuous process is provided. The substrate-free adhesive tape includes a release film, and an adhesive layer provided on one surface of the release film and the adhesive layer containing a cured product of an adhesive composition, wherein when the release film is fixed on the outer surface of a semicircular tip part of a jig, the semicircular tip part having a radius of 22.5 mm, a breaking distance of the adhesive layer is 110 mm or less when the adhesive layer is stretched at a rate of 20 m/min from a semicircular center of the semicircular tip part toward an outermost direction of the semicircular tip part.

8 Claims, 4 Drawing Sheets

[FIG. 1]
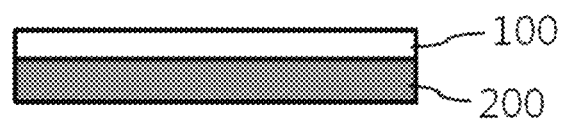
[FIG. 2]
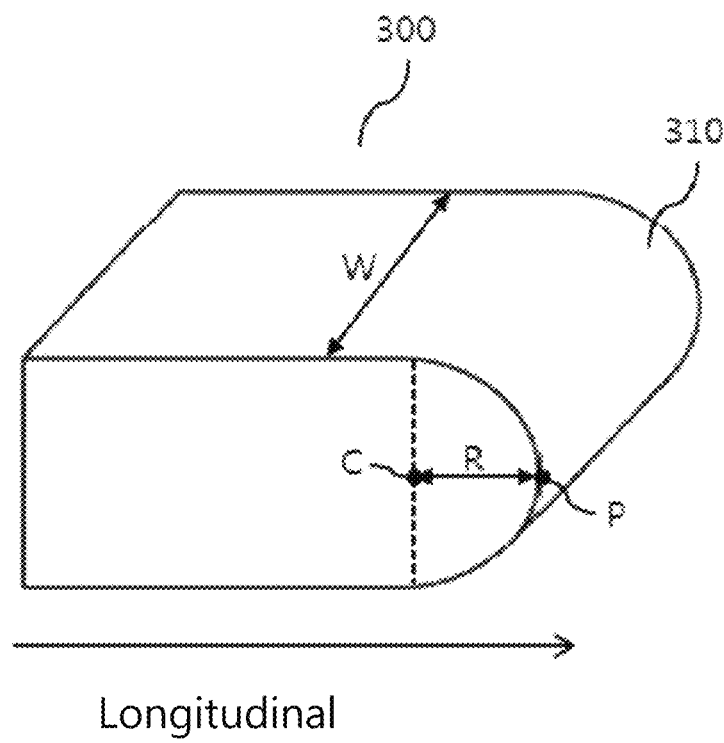
Longitudinal

[FIG. 3]
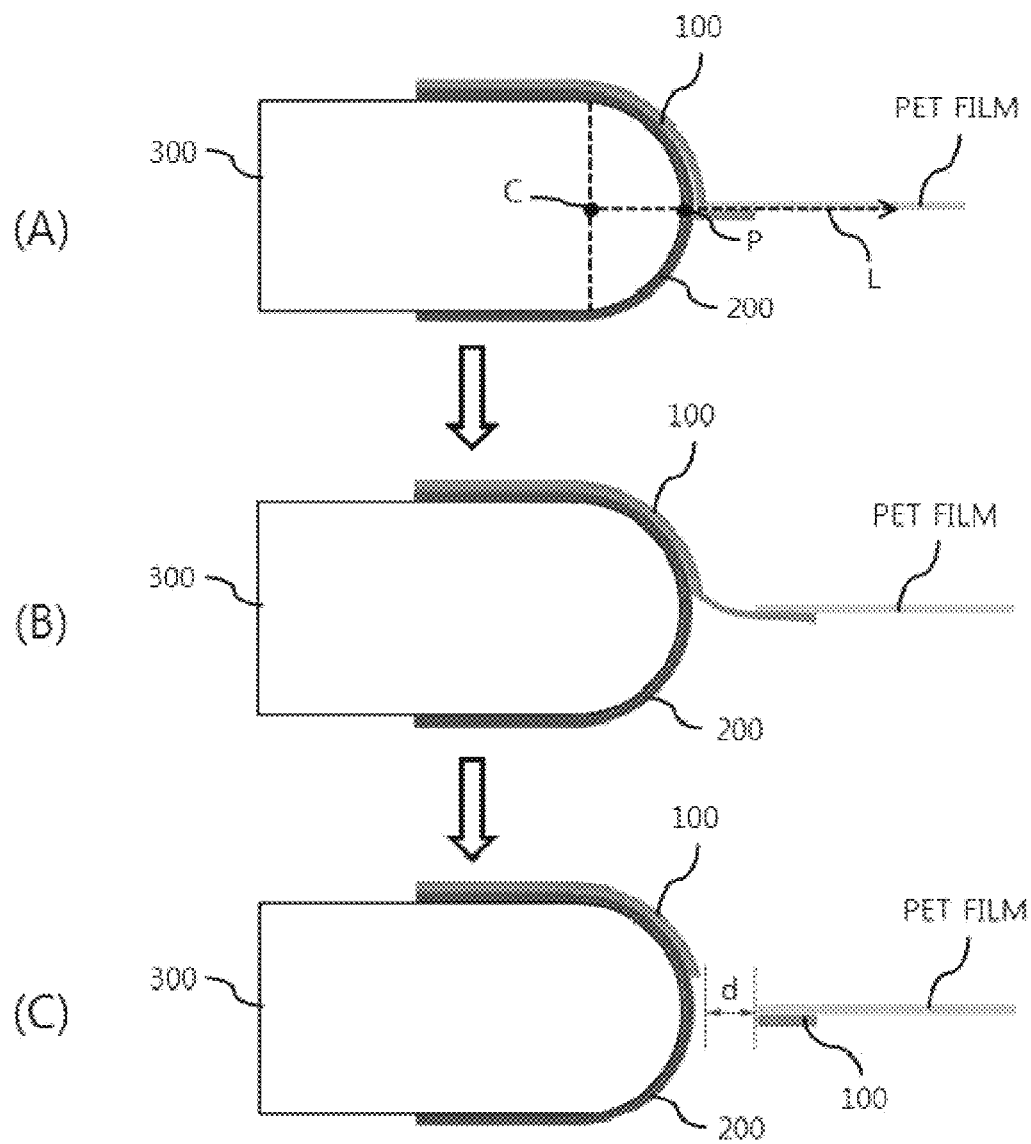

[FIG. 4]
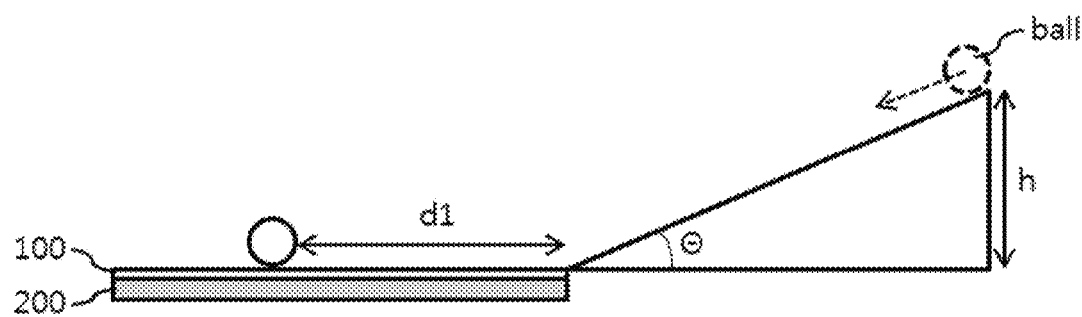
[FIG. 5]
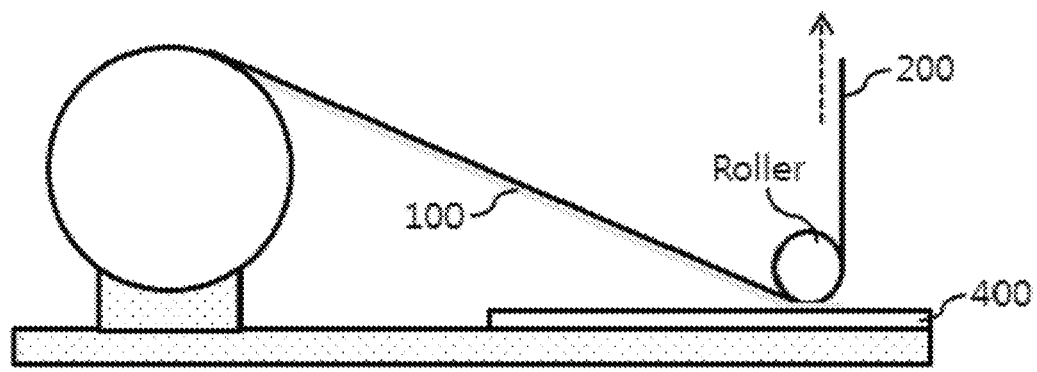

[FIG. 6]
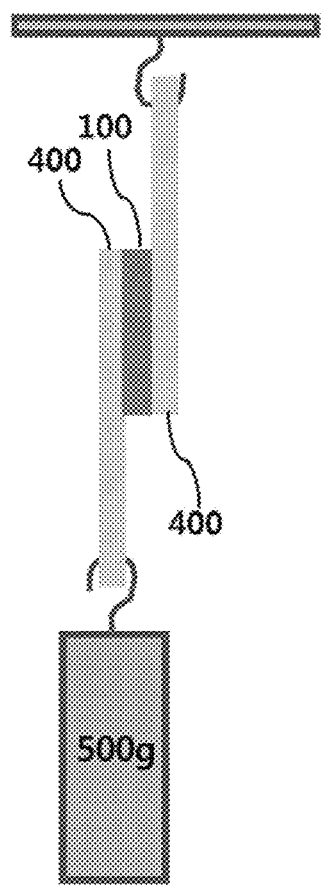

SUBSTRATE-FREE ADHESIVE TAPE

CROSS-REFERENCE TO RELATED APPLICATION(S)

This application is a national phase entry under 35 U.S.C. § 371 of International Application No. PCT/KR2019/009815 filed Aug. 6, 2019 which claims priority from Korean Patent Application No. 10-2018-0092584 filed with the Korean Intellectual Property Office on Aug. 8, 2018, and Korean Patent Application No. 10-2019-0094499 filed with the Korean Intellectual Property Office on Aug. 2, 2019, the entire contents of which are incorporated herein by reference.

TECHNICAL FIELD

The present invention relates to a substrate-free adhesive tape.

BACKGROUND ART

Various members are attached to an electronic device by an adhesive agent. For example, various optical members such as a polarizing plate, a phase difference plate, an optical compensation film, a reflection sheet, a protection film, and a brightness-enhancing film may be attached to a liquid crystal display (LCD) by an adhesive agent.

Recently, as the thickness of the electronic device becomes small, efforts to implement excellent durability while reducing the thickness of an adhesive layer for attaching members in the electronic device have been continuously made.

In order to reduce the thickness of the adhesive layer, an adhesive tape in a substrate-free form has been studied.

However, when the substrate is not used, there may be a problem that high-temperature shear characteristics, adhesive force, etc. of the adhesive layer are lowered.

In addition, electronic devices are manufactured using a continuous process, and in order to apply such a substrate-free adhesive tape to a continuous process, a separate stamping process is needed.

Consequently, there is a problem that the efficiency of the continuous process is lowered.

Accordingly, technologies capable of implementing a substrate-free adhesive tape having excellent adhesive force and suitable for a continuous process are required.

Technical Problem

In one aspect, the present invention provides a substrate-free adhesive tape that is excellent in adhesive physical properties and suitable for a continuous process.

However, the technical objects of the present invention are not limited to the aforementioned object, and other objects, which are not mentioned above, will be clearly understood by those skilled in the art from the following description.

Technical Solution

An exemplary embodiment of the present invention provides a substrate-free adhesive tape including a release film, and an adhesive layer provided on one surface of the release film and containing a cured product of an adhesive composition, wherein the release film is fixed on the outer surface of a tip part of a jig having a semicircular tip part with a radius of 22.5 mm, and wherein a breaking distance of the adhesive layer is 110 mm or less when the adhesive layer is stretched at a rate of 20 m/min from the semicircular center of the tip part toward the outermost direction of the tip part.

Advantageous Effects

According to an exemplary embodiment of the present invention, the substrate-free adhesive tape has shear characteristics suitable for a continuous process and also has a merit of being excellent in adhesive force.

The effects of the present invention are not limited to the above-described effects, and other effects, which are not mentioned, will be clearly understood by those skilled in the art from the detailed description and the accompanying drawings.

BRIEF DESCRIPTION OF THE DRAWINGS

FIG. 1 illustrates a substrate-free adhesive tape according to an exemplary embodiment of the present invention.

FIG. 2 schematically illustrates a jig used when measuring the breaking distance of the adhesive layer of the substrate-free adhesive tape according to an exemplary embodiment of the present invention.

FIG. 3 schematically illustrates measurement of the breaking distance of the adhesive layer of the substrate-free adhesive tape using a jig according to an exemplary embodiment of the present invention.

FIG. 4 schematically illustrates a method for measuring the rolling ball tack of the adhesive layer according to an exemplary embodiment of the present invention.

FIG. 5 schematically illustrates a method for evaluating the transfer characteristics of the adhesive layer according to an exemplary embodiment of the present invention.

FIG. 6 illustrates a method for measuring the high-temperature adhesive holding force distance of the adhesive layer of the substrate-free adhesive tape according to an exemplary embodiment of the present invention.

DETAILED DESCRIPTION OF THE EMBODIMENTS

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

As used herein, the term "parts by weight" may refer to a weight ratio between components.

As used herein, "(meth)acrylate" refers collectively to acrylate and methacrylate.

As used herein, "A and/or B" means "A or B or both A and B."

As used herein, the term "monomer unit" may refer to the reacted form of the monomer in a polymer, and specifically, it may mean a form in which the monomer undergoes a polymerization reaction to form a polymer skeleton, for example, a main chain or a side chain.

As used herein, the "weight average molecular weight" and "number average molecular weight" of a compound can be calculated using the molecular weight and molecular weight distribution of that compound.

Specifically, tetrahydrofuran (THF) and a compound are placed in a 1 ml glass bottle to prepare a test sample having a compound concentration of 1 wt %. A test sample and a standard sample (polystyrene) are filtered through a filter (0.45 mm pore size), and then injected into a GPC injector. The elution time of the test sample can be compared with the calibration curve of the standard sample to obtain the molecular weight and molecular weight distribution of the compound.

At this time, Infinity II 1260 (Agilent) equipment can be used as a measuring instrument, the flow rate may be set to 1.00 mL/min, and the column temperature may be set to 40.0° C.

As used herein, the "glass transition temperature (Tg)" can be determined by differential scanning analysis. Specifically, the sample is heated at a heating rate of 5° C./min in a temperature range of −60° C. to 150° C. using a DSC (Differential Scanning calorimeter, DSC-STAR3, METTLER TOLEDO) to conduct experiments two times (cycles) in the above section, and the glass transition temperature may be determined by measuring the midpoint of a DSC curve created as a point where heat capacity change takes place.

As used herein, the viscosity of a compound may be a value measured with a Brookfield viscometer at a temperature of 25° C.

Hereinafter, the present specification will be described in more detail.

An exemplary embodiment of the present invention provides a substrate-free adhesive tape including a release film, and an adhesive layer provided on one surface of the release film and containing a cured product of an adhesive composition, wherein the release film is fixed on the outer surface of a tip part of a jig having a semicircular tip part with a radius of 22.5 mm, and wherein a breaking distance of the adhesive layer is 110 mm or less when the adhesive layer is stretched at a rate of 20 m/min from the semicircular center of the tip part toward the outermost direction of the tip part.

According to an exemplary embodiment of the present invention, the substrate-free adhesive tape has shear characteristics suitable for a continuous process and also has a merit of being excellent in adhesive strength.

FIG. 1 illustrates a substrate-free adhesive tape according to an exemplary embodiment of the present invention.

Specifically, FIG. 1 illustrates a substrate-free adhesive tape including a release film 200, and an adhesive layer 100 provided on one surface of the release film 200.

According to an exemplary embodiment of the present invention, the substrate-free adhesive tape does not include a substrate, thus it may be an adhesive tape without a substrate.

According to an exemplary embodiment of the present invention, the release film may be removed when using the substrate-free adhesive tape.

Specifically, the release film may protect the adhesive layer until before the substrate-free adhesive tape is attached to a final product, and it may be removed in order to attach the adhesive layer to the final product.

According to an exemplary embodiment of the present invention, the release film may have a thickness of 10 μm or more and 80 μm or less, or 25 μm or more and 75 μm or less.

By adjusting the thickness of the release film in the range as described above, it is possible to prevent the release film from being torn when the release film is peeled from the adhesion layer.

Thereby, it can suppress deterioration of peeling efficiency.

According to an exemplary embodiment of the present invention, the adhesive layer may have a thickness of 10 μm or more and 80 μm or less.

Specifically, the adhesive layer may have a thickness of 20 μm or more and 80 μm or less, 20 μm or more and 70 μm or less, or 30 μm or more and 70 μm or less.

By adjusting the thickness of the adhesive layer in the range as described above, it is possible to provide a substrate-free adhesive tape that realizes natural breakage and release stability during a continuous process.

FIG. 2 schematically illustrates a jig used when measuring the breaking distance of the adhesive layer of the substrate-free adhesive tape according to an exemplary embodiment of the present invention.

Specifically, the jig 300 includes a semicircular tip part 310, and the radius R of the semicircular tip part 310 is 22.5 mm.

In addition, the width W of the jig 300 may be about 65 mm or more and 75 mm or less, but the width W of the jig 300 is not limited thereto.

Referring to FIG. 2, in the cross-section of the jig 300, the tip part 310 may have a semicircular shape.

According to an exemplary embodiment of the present invention, the breaking distance of the adhesive layer of the substrate-free adhesive tape measured when tensile force is applied at a rate of 20 m/min using the jig may be 110 mm or less.

Specifically, the breaking distance of the adhesive layer may be 105 mm or less, or 100 mm or less. In addition, when measuring the breaking distance of the adhesive layer, the thickness of the adhesive layer may be set to 50 μm, and the width may be set to 60 mm.

The adhesive layer of the substrate-free adhesive tape according to an exemplary embodiment of the present invention has a short breaking distance as described above. Therefore, the phenomenon where the adhesive layer is stretched without being broken when tensile force is applied can be minimized.

By using such characteristics, when inducing breakage of an adhesive layer through tension to thereby perform a continuous process without a separate stamping process, the phenomenon where the adhesive layer breaks and shrinks is minimized, and there is an advantage of being capable of stably performing the continuous process.

The substrate-free adhesive tape may be applied to a continuous process such as a roll-to-cell method.

FIG. 3 schematically illustrates the measurement of the breaking distance of the adhesive layer of the substrate-free adhesive tape using a jig according to an exemplary embodiment of the present invention.

Specifically, FIG. 3 (A) shows that the release film 200 is fixed on the outer surface of the tip part of the jig 300 having a semicircular tip part with a radius of 22.5 mm to expose the adhesive layer 100, and one end of the exposed adhesive layer 100 is attached to the PET film.

FIG. 3 (B) shows that in FIG. 3 (A), the PET film is drawn from the semicircular center C of the tip part toward the outermost P direction of the tip part, and the adhesive layer 100 is stretched at a rate of 20 m/min.

FIG. 3 (C) shows that the stretched adhesive layer 100 is broken and then separated from the substrate-free adhesive tape, and shows the breaking distance d at this time.

According to an exemplary embodiment of the present invention, the breaking distance of the adhesive layer of the substrate-free adhesive tape can be easily measured using the jig.

In addition, the jig is designed similar to the conditions of the continuous process to which the substrate-free adhesive tape is applied. When the breaking distance of the adhesive layer of the substrate-free adhesive tape measured using the jig satisfies the above range, it can be easily confirmed that the substrate-free adhesive tape has physical properties that are suitable for the continuous process.

According to an exemplary embodiment of the present invention, and referring to FIG. 2, the semicircular center C of the tip part 310 may mean a radial center of the semicircular tip part 310 in the cross-section of the jig 300.

In addition, the outermost point P of the tip part may mean a point which is located at the outermost side in the semicircular center of the tip part 310 along the direction parallel to the longitudinal direction of the jig 300 in the cross-section of the jig 300.

According to an exemplary embodiment of the present invention, the tensile rate of the adhesive layer and the breaking distance of the adhesive layer may vary depending on the radius of the semicircular tip part of the jig.

That is, the radius of the semicircular tip part of the jig can be adjusted according to the conditions of the continuous process to which the substrate-free adhesive tape is applied.

Further, by adjusting the radius of the semicircular tip part of the jig, the tensile rate and the breaking distance of the adhesive layer are newly set, and the physical properties of the adhesive layer of the substrate-free adhesive tape suitable for the continuous process can be set and measured.

According to an exemplary embodiment of the present invention, the adhesive layer has a distance traveled by the ball according to ASTM D3121 of 25 mm or less.

Specifically, the adhesive layer may have a distance traveled by the ball of 25 mm or less, 20 mm or less, or 15 mm or less when measuring a rolling ball tack according to ASTM D3121.

The adhesive layer having a travelling distance of the ball satisfying the above range when measuring the rolling ball tack according to ASTM D3121 may have excellent adhesive force.

FIG. 4 schematically illustrates a method for measuring the rolling ball tack of the adhesive layer according to an exemplary embodiment of the present invention.

Specifically, FIG. 4 illustrates a method for measuring a rolling ball tack according to ASTM D3121, which shows that an iron ball having a diameter of 11.1 mm and a weight of 5.6 g is placed at a height of 65 mm on an inclined surface having an inclination angle θ of 21°, and the distance d1 traveled by the iron ball on the adhesion layer 100 by rolling the iron ball on the adhesion layer 100 is measured.

According to an exemplary embodiment of the present invention, the adhesive layer of the substrate-free adhesive tape may be excellent in transfer characteristics of an adherend.

In the present specification, the transfer characteristics of the adherend of the adhesive layer can be evaluated as follows.

A PET film having dimensions of 300 mm×400 mm and a thickness of 50 μm as the adherend is fixed onto the bottom surface of the equipment.

Further, a substrate-free adhesive tape cut to a width of 60 mm and a length of 200 mm is prepared, and then about 70 mm of a surface on one end of an exposed adhesive layer is attached to one end of the PET film.

Then, transfer characteristics of the adhesive layer can be evaluated by using a roller with a load of 2 kg to attach the adhesive layer to the PET film and simultaneously remove the release film.

Specifically, 50 mm of the release film is peeled off from the attached 70 mm area, wound around the rear part of the roller, and held so as to be removable, and then the adhesive layer is attached to the adherend at a rate of 7.5 m/min and the release film is simultaneously peeled off from the adhesive layer.

At this time, when the adhesive layer is transferred to the PET film surface which is an adherend, the transfer characteristics of the adhesive layer can be evaluated as excellent, and when the adhesive layer remains on the release film without being attached to the adherend, the transfer characteristics can be evaluated as inferior.

FIG. 5 schematically illustrates a method for evaluating the transfer characteristics of the adhesive layer according to an exemplary embodiment of the present invention.

Referring to FIG. 5, it shows an evaluation method confirming that the wound substrate-free adhesive tape is unwound, and the adhesive layer 100 is attached to the adherend 400 using a roller with a load of 2 kg, and simultaneously the release film is drawn at a rate of 7.5 m/min while the release film 200 is peeled off from the adhesive layer 100 and the adhesive layer 100 is transferred to the adherend 400.

According to an exemplary embodiment of the present invention, the adhesive layer of the substrate-free adhesive tape can be excellent in high-temperature adhesive holding force.

Specifically, the high-temperature adhesive holding force distance of the adhesive layer may be 3 mm or less, 2.5 mm or less, 2 mm or less, 1.5 mm or less, or 1 mm or less.

In the present specification, the high-temperature adhesive holding force distance of the adhesive layer may be measured as shown in FIG. 6.

FIG. 6 illustrates a method for measuring the high-temperature adhesive holding force distance of the adhesive layer of the substrate-free adhesive tape according to an exemplary embodiment of the present invention.

Referring to FIG. 6, an adhesive layer 100 cut to a size of 1 inch in width and 1 inch in length is provided between two SUS304 bars, which are adherends 400, and pressed with a weight of 6 kg for 30 seconds. The adhesive layer 100 is attached between the two SUS304 bars to prepare a laminate, which is left at room temperature (25° C.) for 1 hour.

After that, the laminate is positioned perpendicular to the ground, and then one SUS304 bar is fixed to a support and a weight of 500 g is suspended on another SUS304 bar, which is left at a temperature condition of 85° C. for 24 hours.

Then, the high-temperature holding force distance of the adhesive layer can be measured by determining the distance that the SUS304 bar having the weight suspended travels downward from the initial position.

According to an exemplary embodiment of the present invention, the tensile strength of the adhesive layer of the substrate-free adhesive tape may be 60 gf/6 cm or more and 130 gf/6 cm or less, 65 gf/6 cm or more and 125 gf/6 cm or less, or 70 gf/6 cm or more and 120 gf/6 cm or less. The tensile strength of the adhesive layer of the substrate-free adhesive tape can be measured as follows.

As shown in FIG. 3, the release film 200 of the substrate-free adhesive tape is fixed on the outer surface of the semicircular tip part 310 of the jig 300 to expose the adhesive layer 100, and one end of the exposed adhesive layer 100 is attached to a member such as a PET film.

After that, the adhesive layer 100 is stretched at a rate of 20 m/min from the semicircular center C of the tip part toward the outermost P direction of the tip part, and the tensile strength until the adhesive layer 100 breaks is measured.

Then, the tensile strength of the adhesive layer can be calculated by determining the maximum value of the tensile strength measured from the time when the adhesive layer starts to be stretched until it breaks.

At this time, the tensile strength of the adhesive layer can be measured by using an AR-1000 tester (manufacturer: Cheminstruments Inc.).

According to an exemplary embodiment of the present invention, one surface of the release film may have a greater release peel force from the adhesive layer than the other surface.

That is, with respect to the adhesive layer, one surface of the release film may be a heavy peel surface, and the other surface of the release film may be a light peel surface.

In addition, the heavy peel surface may mean a surface of the release film brought into contact with the adhesive layer when the adhesive tape is unwound, and the light peel surface may mean a surface opposite to the surface of the release film brought into contact with the adhesive layer when the adhesive tape is unwound.

According to an exemplary embodiment of the present invention, the release peel force between the heavy peel surface and the adhesive layer may be 65 g/in or less, 60 g/in or less, or 55 g/in or less at the time of peeling off the adhesive layer at a rate of 0.3 m/min.

Further, the release peel force between the heavy peel surface and the adhesive layer may be 15 g/in or more, 20 g/in or more, or 25 g/in or more at the time of peeling off the adhesive layer at a rate of 0.3 m/min.

The substrate-free adhesive tape has an advantage in that, by adjusting the release peel force between the heavy peel surface and the adhesive layer within the above range, it is possible to minimize a phenomenon in which the adhesive layer is lifted up from an adhered at the time of removing the release film after attaching the adhesive layer to the adherend.

Specifically, the substrate-free adhesive tape may minimize a phenomenon in which the adhesive layer is lifted up from the adhered at the time of removing the release film after attaching the adhesive layer to the adherend, by adjusting the release peel force between the adhesive layer and the heavy peel surface of the release film at a very low level as in the above range.

According to an exemplary embodiment of the present invention, the release peel force of the heavy peel surface of the release film may be 25 g/in or more and 60 g/in or less at the time of peeling off tesa 7475 tape which is a reference tape at a rate of 2.4 m/min.

Specifically, the release peel force of the heavy peel surface of the release film may be 25 g/in or more and 55 g/in or less, or 30 g/in or more and 55 g/in or less, at the time of peeling off tesa 7475 tape which is a reference tape at a rate of 2.4 m/min. The release peel force of the heavy peel surface or the light peel surface of the release film was measured as follows.

Specifically, a reference tape (tesa 7475) with a width of 25.4 mm× a length of 150 mm was attached to a heavy peel surface of a release film by reciprocating a roller with a load of 2 kg twice at a rate of 10 mm/s.

Further, aging is performed for 24 hours in order to sufficiently attach the reference tape to the heavy peel surface of the release film, and then peel strengths at 180 degrees are measured at a rate of 0.3 m/min or 2.4 m/min by using an AR-1000 tester (manufacturer: Cheminstruments Inc.).

According to an exemplary embodiment of the present invention, the heavy peel surface of the release film may be a release layer formed by coating onto one surface of the light peel surface using a silicone-based release agent.

However, the release layer is not limited thereto, and may be a layer formed by using a release agent commonly used in the art.

According to an exemplary embodiment of the present invention, a light peel surface of the release film may be paper, a fiber sheet (woven fabric or non-woven fabric), or a polymer film.

Specifically, according to an exemplary embodiment of the present invention, the light peel surface of the release film may be paper.

The light peel surface may be release layer coated onto an opposite surface on which the heavy peel surface is provided.

When paper is used as the light peel surface, costs may be reduced as compared to the case where a polymer film is used.

According to an exemplary embodiment of the present invention, the substrate-free adhesive tape may be in a wound form.

Specifically, the substrate-free adhesive tape may be provided in the form of a wound roll, and a continuous process may be carried out on the substrate-free adhesive tape through a continuous apparatus equipped with an unwinder.

According to an exemplary embodiment of the present invention, the release peel force between the light peel surface and the adhesive layer may be 15 g/in or more and 70 g/in or less at the time of peeling off the adhesive layer at a rate of 2.4 m/min.

In the present specification, the release peel force between the light peel surface and the adhesive layer may be measured by the same procedure as in the above-described method for measuring the release peel force between the adhesive layer and the heavy peel surface of the release film.

When the substrate-free adhesive tape is in a wound form, a surface opposite to the surface of the adhesive layer brought into contact with the heavy peel surface is brought into contact with the light peel surface of the release film.

When the release peel force between the light peel surface and the adhesive layer is within the above range, the adhesive layer may not be damaged when the substrate-free adhesive tape in a wound form is applied in a continuous process through an unwinder, and the like.

According to an exemplary embodiment of the present invention, the adhesive composition may include an acrylic copolymer obtained by copolymerization of a monomer mixture containing: an alkyl group-containing (meth)acrylate monomer; a cycloalkyl group-containing (meth)acrylate monomer; a heterocycloalkyl group-containing (meth)acrylate monomer; a polar group-containing (meth)acrylate monomer; and a (meth)acrylate monomer represented by the following Chemical Formula 1.

[Chemical Formula 1]

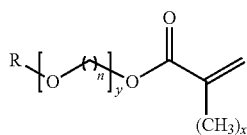

In Chemical Formula 1, x is 0 or 1, y is an integer of 14 to 23, n is an integer of 2 to 4, and R is a hydrogen atom, a methyl group, or an ethyl group.

According to an exemplary embodiment of the present invention, the acrylic copolymer may be formed through a copolymerization reaction between: an alkyl group-containing (meth)acrylate monomer; a cycloalkyl group-containing (meth)acrylate monomer; a heterocycloalkyl group-containing (meth)acrylate monomer; a polar group-containing (meth)acrylate monomer; and a (meth)acrylate monomer represented by Chemical Formula 1 which are contained in the monomer mixture.

According to an exemplary embodiment of the present invention, the acrylic copolymer may include an alkyl group-containing (meth)acrylate monomer unit derived from the alkyl group-containing (meth)acrylate monomer, a cycloalkyl group-containing (meth)acrylate monomer unit derived from the cycloalkyl group-containing (meth)acrylate monomer, a heterocycloalkyl group-containing (meth)acrylate monomer unit derived from the heterocycloalkyl group-containing (meth)acrylate monomer, a polar group-containing (meth)acrylate monomer unit derived from the polar group-containing (meth)acrylate monomer, and a monomer unit derived from the (meth)acrylate monomer represented by Chemical Formula 1.

According to an exemplary embodiment of the present invention, the content of the alkyl group-containing (meth)acrylate monomer may be 50 parts by weight or more and 75 parts by weight or less based on 100 parts by weight of the monomer mixture.

Specifically, the content of the alkyl group-containing (meth)acrylate monomer may be 50 parts by weight or more and 70 parts by weight or less, 55 parts by weight or more and 70 parts by weight or less, 58 parts by weight or more and 70 parts by weight or less, 50 parts by weight or more and 62 parts by weight or less, 60 parts by weight or more and 70 parts by weight or less, or 62 parts by weight or more and 65 parts by weight or less, based on 100 parts by weight of the monomer mixture.

By adjusting the content of the alkyl group-containing (meth)acrylate monomer in the range as described above, it is possible to appropriately control the glass transition temperature (Tg) that can exhibit the bulk properties of the adhesive layer containing a cured product of the adhesive composition, to improve the wettability that can exhibit the interface characteristics of the adhesive layer, and to further improve the adhesiveness of the adhesive layer.

In the present specification, the "alkyl group" may mean including a chainlike hydrocarbon structure in which an unsaturated bond is not present in a functional group.

According to an exemplary embodiment of the present invention, the alkyl group-containing (meth)acrylate monomer may include at least one selected from methyl (meth)acrylate, ethyl (meth)acrylate, n-propyl (meth)acrylate, iso-propyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl-5-(meth)acrylate, isooctyl (meth)acrylate, and 2-ethylhexyl (meth)acrylate.

According to an exemplary embodiment of the present invention, the content of the cycloalkyl group-containing (meth)acrylate monomer may be 5 parts by weight or more and 15 parts by weight or less based on 100 parts by weight of the monomer mixture.

Specifically, the content of the cycloalkyl group-containing (meth)acrylate monomer may be 7 parts by weight or more and 13 parts by weight or less, 9 parts by weight or more and 10 parts by weight or less, 5 parts by weight or more and 8 parts by weight or less, or 10 parts by weight or more and 14 parts by weight or less, based on 100 parts by weight of the monomer mixture.

By adjusting the content of the cycloalkyl group-containing (meth)acrylate monomer in the range as described above, it is possible to implement an adhesive layer having excellent attachment force to an adherend having low surface energy.

According to an exemplary embodiment of the present invention, the cycloalkyl group may include a carbon ring structure in which an unsaturated bond is not present in the functional group, and may include a monocyclic ring or a polycyclic ring which has 3 to 20 carbon atoms.

According to an exemplary embodiment of the present invention, the cycloalkyl group-containing (meth)acrylate monomer may include at least one selected from cyclohexyl acrylate, cyclohexyl methacrylate, isobornyl acrylate, isobornyl methacrylate, 3,3,5-trimethylcyclohexyl acrylate, 3,3,5-trimethylcyclohexyl methacrylate, t-butylcyclohexyl acrylate, and t-butylcyclohexyl methacrylate.

According to an exemplary embodiment of the present invention, the content of the heterocycloalkyl group-containing (meth)acrylate monomer may be 2 parts by weight or more and 7 parts by weight or less based on 100 parts by weight of the monomer mixture.

Specifically, the content of the heterocycloalkyl group-containing (meth)acrylate monomer may be 3.5 parts by weight or more and 5 parts by weight or less, 2.5 parts by weight or more and 4.5 parts by weight, or 5.5 parts by weight or more and 7 parts by weight or less, based on 100 parts by weight of the monomer mixture.

When the content of the heterocycloalkyl group-containing (meth)acrylate monomer is within the above range, excellent adhesive force may be maintained by lowering a glass transition temperature (Tg) of the adhesive layer containing a cured product of the adhesive composition, and the wettability of the adhesive layer may be improved.

According to an exemplary embodiment of the present invention, the heterocycloalkyl group may include a ring structure in which an unsaturated bond is not present in the functional group and a heteroatom other than carbon is included, and may include a monocyclic ring or a polycyclic ring which has 2 to 20 carbon atoms.

According to an exemplary embodiment of the present invention, the heterocycloalkyl group-containing (meth) acrylate monomer may include at least one selected from tetrahydrofurfuryl acrylate, tetrahydropyranyl acrylate, acryloylmorpholine, and cyclic trimethylolpropane formal acrylate.

According to an exemplary embodiment of the present invention, since the adhesive composition includes a (meth) acrylate monomer represented by the following Chemical Formula 1, it is possible to improve a cohesive force of the adhesion layer containing the cured product of the adhesive composition, to appropriately control the glass transition temperature (Tg) of the adhesive layer, and to easily maintain the adhesive force to an adherend of the adhesive layer.

In addition, it is possible to improve the high temperature holding force of the adhesive layer.

[Chemical Formula 1]

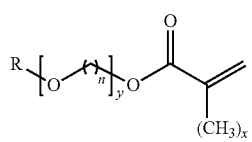

In Chemical Formula 1, x is 0 or 1, y is an integer of 14 to 23, n is an integer of 2 to 4, and R is a hydrogen atom, a methyl group, or an ethyl group.

According to an exemplary embodiment of the present invention, in Chemical Formula 1, y may be an integer of 16 to 23, an integer of 18 to 23, or an integer of 20 to 23.

Specifically, in Chemical Formula 1, y may be an integer of 23.

In addition, in Chemical Formula 1, n may be an integer of 2 to 4, and specifically, n may be an integer of 2.

According to an exemplary embodiment of the present invention, the adhesive composition including the compound represented by Chemical Formula 1 in which x, y, n, and R satisfy the above range may implement an adhesive layer having effectively improved cohesive and adhesive forces.

In addition, the adhesive composition including the compound represented by Chemical Formula 1 may implement an adhesive layer having a breaking property suitable for a continuous process.

Specifically, by using the compound represented by Chemical Formula 1, it is possible to easily form an acrylic copolymer having a weight average molecular weight of 800,000 g/mol or more and 1,200,000 g/mol or less, and to secure excellent coating properties of the adhesive composition.

In the present invention, as the (meth)acrylate monomer represented by Chemical Formula 1, AMG-230G (in Chemical Formula 1, x is 1, y is 23, n is 2, and R is a methyl group; Shin-Nakamura Chemical) can be used.

According to an exemplary embodiment of the present invention, the content of the (meth)acrylate monomer represented by Chemical Formula 1 may be 2 parts by weight or more and 15 parts by weight or less based on 100 parts by weight of the monomer mixture.

Specifically, the content of the (meth)acrylate monomer represented by Chemical Formula 1 may be 5 parts by weight or more and 13 parts by weight or less, 7 parts by weight or more and 10 parts by weight or less, 3 parts by weight or more and 8 parts by weight or less, or 9 parts by weight or more and 14 parts by weight or less, based on 100 parts by weight of the monomer mixture.

According to an exemplary embodiment of the present invention, by adjusting the content of the (meth)acrylate monomer represented by Chemical Formula 1 in the range as described above, it is possible to effectively improve cohesive and adhesive forces of the adhesive layer containing the cured product of the adhesive composition.

Specifically, when the content of the (meth)acrylate monomer represented by Chemical Formula 1 is within the above range, the glass transition temperature (Tg) of the adhesive layer containing the cured product of the adhesive composition is lowered, and it is also possible to suppress the cohesive force from being lowered, thereby maintaining excellent adhesive force of the adhesive layer.

In addition, by adjusting the content of the (meth)acrylate monomer represented by Chemical Formula 1 in the range as described above, it is possible to effectively improve the adhesive holding force at a high temperature of the adhesive layer.

Furthermore, the adhesive composition containing the (meth)acrylate monomer represented by Chemical Formula 1 in the above range can enhance a self-cohesive force of the composition, and implement an adhesive layer having a breaking property suitable for a continuous process.

According to an exemplary embodiment of the present invention, the content of the polar group-containing (meth)acrylate monomer may be 3 parts by weight or more and 7 parts by weight or less based on 100 parts by weight of the monomer mixture.

Specifically, the content of the polar group-containing (meth)acrylate monomer may be 4.5 parts by weight or more and 6 parts by weight or less, or 3.5 parts by weight or more and 5 parts by weight or less, based on 100 parts by weight of the monomer mixture.

When the content of the polar group-containing (meth)acrylate monomer is within the above range, the adhesive composition may implement an adhesive layer having breaking properties suitable for a continuous process and excellent adhesive holding force at high temperatures.

In addition, by adjusting the content of the polar group-containing (meth)acrylate monomer in the range as described above, an adhesive layer having an optimal degree of crosslinking can be implemented, and thus the distance at the time of breaking the adhesive layer can be reduced, thereby providing an adhesive layer suitable for the continuous process.

According to an exemplary embodiment of the present invention, the polar functional group-containing monomer may include at least one selected from a hydroxyl group-containing monomer, a carboxyl group-containing monomer, and a nitrogen-containing monomer.

When a carboxyl group-containing monomer is used as the polar functional group-containing monomer, the crosslinking efficiency of the alkyl group-containing (meth)acrylate monomer, the cyclic substituent-containing (meth)acrylate monomer, and the (meth)acrylate monomer represented by Chemical Formula 1 and the adhesive force of the adhesive layer can be effectively improved.

According to an exemplary embodiment of the present invention, the hydroxyl group-containing monomer may include at least one selected from 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol(meth)acrylate, and 2-hydroxypropylene glycol(meth)acrylate.

According to an exemplary embodiment of the present invention, the carboxyl group-containing monomer may include at least one selected from acrylic acid, methacrylic acid, 2-(meth)acryloyloxy acetic acid, 3-(meth)acryloyloxypropyl acid, 4-(meth)acryloyloxy butyric acid, an acrylic acid dimer, itaconic acid, and maleic acid.

According to an exemplary embodiment of the present invention, the nitrogen-containing monomer may include at least one selected from 2-isocyanatoethyl (meth)acrylate, 3-isocyanatopropyl (meth)acrylate, and 4-isocyanatobutyl (meth)acrylate.

According to an exemplary embodiment of the present invention, the weight ratio of the (meth)acrylate monomer represented by Chemical Formula 1 and the polar group-containing (meth)acrylate monomer may be 7:1 to 2:1.

Specifically, the weight ratio of the (meth)acrylate monomer represented by Chemical Formula 1 and the polar group-containing (meth)acrylate monomer may be 6:1 to 2:1, 5:1 to 2:1, 5.5:1 to 2.5:1, or 4:1 to 3:1.

When the weight ratio of the (meth)acrylate monomer represented by Chemical Formula 1 and the polar group-containing (meth)acrylate monomer is within the above range, the cohesive force of the adhesive layer can be prevented from becoming excessively high, and the adhesive layer is easily broken and thus can be easily applied to a continuous process.

In addition, by adjusting the weight ratio in the range as described above, it is possible to effectively improve the adhesive holding force of the adhesive layer at a high temperature.

According to an exemplary embodiment of the present invention, the acrylic copolymer can be prepared using a copolymerization reaction used in the art.

For example, the acrylic copolymer can be produced by thermal polymerization or photopolymerization of the monomer mixture.

Specifically, the acrylic copolymer can be prepared using a thermal polymerization method.

According to an exemplary embodiment of the present invention, a solvent may be added to the monomer mixture to prepare a composition, which can be used to prepare the acrylic copolymer.

In addition, the content of the solvent can be adjusted to 150 parts by weight or more and 300 parts by weight or less based on 100 parts by weight of the monomer mixture.

By adjusting the content of the solvent in the range as described above, it is possible to effectively suppress an increase in the viscosity of the monomer mixture in the process of preparing the acrylic copolymer.

Thereby, the monomer mixture may be effectively stirred in the process of preparing the acrylic copolymer, and the polymerization reaction of the acrylic copolymer may be effectively performed.

Specifically, by adjusting the content of the solvent in the range as described above, the solid content of the monomer mixture containing the monomers and the solvent can be controlled to 25% to 40%.

By appropriately adjusting the solid content of the monomer mixture as in the above-described range, it is possible to effectively perform the polymerization reaction of the acrylic copolymer.

According to an exemplary embodiment of the present invention, as the solvent, one used in the art may be used without limitation, and for example, the solvent may include at least one selected from ethyl acetate, butyl acetate, toluene, methyl ethyl ketone, and methyl isobutyl ketone.

However, the type of the solvent is not limited to those described above.

According to an exemplary embodiment of the present invention, the weight average molecular weight of the acrylic copolymer may be 800,000 g/mol or more and 1,200,000 g/mol or less.

Specifically, the weight average molecular weight of the acrylic copolymer may be 850,000 g/mol or more and 1,150,000 g/mol or less, 1,000,000 g/mol or more and 1,100,000 g/mol or less, 800,000 g/mol or more and 950,000 g/mol or less, or 1,100,000 g/mol or more and 1,200,000 g/mol or less.

By adjusting the weight average molecular weight of the acrylic copolymer in the range as described above, it is possible to prevent a peeling phenomenon that may occur during processing after attaching the adhesive layer to an adherend. Further, it is possible to improve low-temperature workability of the adhesive layer.

In addition, when the weight average molecular weight of the acrylic copolymer is within the above range, it is possible for the adhesive layer to prevent an adhesion defect with an adherend such as a glass panel caused by curing shrinkage, and even when a working surface is shrunk or deformed by temperature, humidity, or the like, the adhesive layer may have excellent durability.

Furthermore, by adjusting the weight average molecular weight of the acrylic copolymer in the range as described above, it is possible to improve the high temperature stability of the adhesive layer and to implement a short breaking distance of the adhesive layer.

Thereby, it is possible to provide an adhesive layer that is easy to apply to a continuous process.

According to an exemplary embodiment of the present invention, the glass transition temperature of the acrylic copolymer may be −55° C. or more and −35° C. or less. Specifically, the glass transition temperature of the acrylic copolymer may be −50° C. or more and −38° C. or less, −48° C. or more and −40° C. or less, or −46° C. or more and −40° C. or less.

When the glass transition temperature of the acrylic copolymer is within the above range, it is possible to improve the cohesive force of the adhesive composition.

Thereby, it is possible to implement the adhesive layer that is excellent in durability.

According to an exemplary embodiment of the present invention, the adhesive composition may further include one or more crosslinking agents selected from the group consisting of an acrylate-based crosslinking agent, an isocyanate-based crosslinking agent, an epoxy-based crosslinking agent, an aziridine-based crosslinking agent, and a metal chelate crosslinking agent.

Specifically, the adhesive composition may further include an aziridine-based crosslinking agent.

The crosslinking agent may produce a crosslinking network in the adhesive layer, thereby securing cohesive force of the adhesive layer and imparting heat resistance.

According to an exemplary embodiment of the present invention, the acrylate-based crosslinking agent may be one or more selected from the group consisting of butanediol diacrylate, pentanediol diacrylate, hexanediol diacrylate, ethylene glycol diacrylate, diethylene glycol diacrylate, triethylene glycol diacrylate, tetraethylene glycol diacrylate, propylene glycol diacrylate, dipropylene glycol diacrylate, and tripropylene diacrylate.

According to an exemplary embodiment of the present invention, the isocyanate-based crosslinking agent may be one or more selected from the group consisting of crosslinking agents produced by allowing at least one diisocyanate of tolylene diisocyanate, xylene diisocyanate, diphenylmethane diisocyanate, hexamethylene diisocyanate, isophorone diisocyanate, tetramethylxylene diisocyanate, and naphthalene diisocyanate to react with a polyol.

According to an exemplary embodiment of the present invention, the epoxy-based crosslinking agent may be one or more selected from the group consisting of ethylene glycol diglycidyl ether, triglycidyl ether, trimethylolpropane triglycidyl ether, N,N,N',N'-tetraglycidyl ethylenediamine, and glycerin diglycidyl ether.

According to an exemplary embodiment of the present invention, the aziridine-based crosslinking agent may be one or more selected from the group consisting of N,N'-toluene- 2,4-bis(1-aziridine carboxamide), N,N'-diphenylmethane-4,4'-bis(1-aziridine carboxamide), triethylenemelamine, bisisoprothaloyl-1-(2-methylaziridine), tri-1-aziridinyl phosphine oxide, and N,N'-bismethylene iminoisophthalamide, but are not limited thereto.

According to an exemplary embodiment of the present invention, the metal chelate crosslinking agent may include acetyl acetone, acetoacetic acid ethyl, or the like, in which one or two or more polyvalent metals such as aluminum, iron, zinc, tin, titanium, antimony, magnesium, and vanadium are coordinated, but is not limited thereto.

According to an exemplary embodiment of the present invention, the content of the crosslinking agent may be 0.01 parts by weight or more and 5 parts by weight or less, 0.03 parts by weight or more and 5 parts by weight or less, or 0.1 parts by weight or more and 5 parts by weight or less, based on 100 parts by weight of the acrylic copolymer.

When the content of the crosslinking agent is within the above range, the crosslinking density in the adhesive layer is appropriately adjusted, so that cohesive force and heat resistance may be implemented at an appropriate level, and adhesive force of the adhesive layer may also be improved.

According to an exemplary embodiment of the present invention, the adhesive composition may further include an adhesive imparting resin from the viewpoint of adjusting the adhesive performance.

According to an exemplary embodiment of the present invention, the adhesive imparting resin may include one or more selected from the group consisting of: a hydrocarbon-based resin or a hydrogen additive thereof; a rosin resin or a hydrogen additive thereof; a rosin ester resin or a hydrogen additive thereof; a terpene resin or a hydrogen additive thereof; a terpene phenol resin or a hydrogen additive thereof; and a polymerized rosin resin or a polymerized rosin ester resin.

However, the adhesive imparting resin is not limited thereto, and may be used without limitation as long as it is a resin generally used in the art.

According to an exemplary embodiment of the present invention, the content of the adhesive imparting resin may be 1 part by weight or more and 100 parts by weight or less based on 100 parts by weight of the alkyl group-containing (meth)acrylate monomer.

When the content of the adhesive imparting resin is within the above range, it is possible to maximize improvement in compatibility and cohesive force of the adhesive layer.

According to an exemplary embodiment of the present invention, the adhesive composition may further include one or more additives selected from the group consisting of an acrylic low-molecular weight material, an epoxy resin, a UV stabilizer, an antioxidant, a toning agent, a reinforcing agent, a filler, an antifoaming agent, a surfactant, and a plasticizer within a range not affecting the effects of the invention.

Hereinafter, the present invention will be described in detail with reference to examples for specifically describing the present invention.

However, the examples according to the present invention may be modified in various forms, and it is not interpreted that the scope of the present invention is limited to the examples to be described below.

Examples of the present specification are provided for more completely explaining the present invention to a person with ordinary skill in the art.

Example 1

An adhesive composition having a weight average molecular weight of about 1,100,000 g/mol and a solid content of 25 wt % was produced by solution-polymerizing 16.7 parts by weight of isobornyl acrylate (Solvay), 8.3 parts by weight of tetrahydrofurfuryl acrylate (M150, Miwon Specialty Chemical), 33.4 parts by weight of 2-(2-ethoxyethoxy)ethylacrylate (M170, Miwon Specialty Chemical), and 8.3 parts by weight of acrylic acid (LG Chem Ltd), based on 100 parts by weight of 2-ethylhexyl acrylate (LG Chem Ltd.) in a 1 L glass reactor.

0.01 parts by weight of an aziridine-based crosslinking agent and 3 parts by weight of a terpene phenol-based adhesive imparting agent were put into 100 parts by weight of the produced adhesive composition and the resulting mixture was coated on a silicone release coated Paper Liner A, and then dried in an oven at 100° C. for 3 minutes to produce an adhesive layer having a thickness of 50 μm.

Then, a wound substrate-free adhesive tape was produced by aging the adhesive layer in an oven at 50° C. for 48 hours.

Example 2

A substrate-free adhesive tape was produced in the same manner as Example 1 by using Paper Liner A, except that an adhesive composition having a weight average molecular weight of about 1,050,000 g/mol and a solid content of 25% by weight was produced by using 14.3 parts by weight of isobornyl acrylate, 7.2 parts by weight of tetrahydrofurfuryl acrylate, 14.3 parts by weight of 2-(2-ethoxyethoxy)ethyl acrylate, and 7.2 parts by weight of acrylic acid based on 100 parts by weight of 2-ethylhexyl acrylate.

Example 3

A substrate-free adhesive tape was produced in the same manner as Example 1 by using Paper Liner B, except that the adhesive imparting agent was not used.

Example 4

A substrate-free adhesive tape was produced in the same manner as Example 1 by using Paper Liner A, except that the weight average molecular weight was about 820,000 g/mol.

Example 5

A substrate-free adhesive tape was produced in the same manner as Example 1 by using Paper Liner A, except that an adhesive composition having a weight average molecular weight of about 1,080,000 g/mol and a solid content of 25% by weight was produced by using 15.4 parts by weight of isobornyl acrylate, 30.7 parts by weight of 2-(2-ethoxyethoxy)ethyl acrylate, and 7.7 parts by weight of acrylic acid based on 100 parts by weight of 2-ethylhexyl acrylate.

Comparative Example 1

A resin composition having a weight average molecular weight of about 1,100,000 g/mol and a solid content of 25 wt % was produced by using 16.7 parts by weight of isobornyl acrylate, 8.3 parts by weight of tetrahydrofurfuryl acrylate, and 8.3 parts by weight of acrylic acid, based on 100 parts by weight of 2-ethylhexyl acrylate.

0.01 parts by weight of an aziridine-based crosslinking agent was put into 100 parts by weight of the produced adhesive composition and the resulting mixture was coated on a silicone release coated Paper Liner A, and then dried in an oven at 100° C. for 3 minutes to produce an adhesive layer having a thickness of 50 μm.

Subsequently, a substrate-free adhesive tape was produced in the same manner as in Example 1.

Comparative Example 2

0.01 parts by weight of an aziridine-based curing agent and 3 parts by weight of a terpene phenol-based adhesive imparting agent were put into 100 parts by weight of the adhesive composition produced in Comparative Example 1, and the resulting mixture was coated on a silicone release coated Paper Liner B and then dried in an oven at 100° C. for 3 minutes to produce an adhesive layer having a thickness of 50 μM.

Subsequently, a substrate-free adhesive tape was produced in the same manner as in Example 1.

Comparative Example 3

A substrate-free adhesive tape was produced in the same manner as Comparative Example 2, except that Paper Liner D was used.

Comparative Example 4

A substrate-free adhesive tape was produced in the same manner as Example 1 by using Paper Liner A, except that an adhesive composition having a weight average molecular weight of about 1,000,000 g/mol and a solid content of 25% by weight was produced by using 41.6 parts by weight of isobornyl acrylate and 12.3 parts by weight of acrylic acid based on 100 parts by weight of 2-ethylhexyl acrylate.

Comparative Example 5

A substrate-free adhesive tape was produced in the same manner as Example 5, except that Paper Liner C was used.

Comparative Example 6

A substrate-free adhesive tape was produced in the same manner as Example 5, except that Paper Liner D was used.

Experimental Example

Physical properties of the adhesive layer of the substrate-free adhesive transfer tapes produced in the examples and comparative examples were evaluated by the following methods, and the results are shown in Table 1 below.

1. Measurement of Breaking Performance

FIG. 3 schematically illustrates the measurement of the breaking distance of the adhesive layer of the substrate-free adhesive tape using a jig according to an exemplary embodiment of the present invention. Specifically, FIG. 3 (A) shows that the release film 200 was fixed on the outer surface of the tip part of the jig 300 with a semicircular tip part having a radius of 22.5 mm to expose the adhesive layer 100, and one end of the exposed adhesive layer 100 was attached to the PET film.

FIG. 3 (B) shows that in FIG. 3 (A), the PET film was drawn from the semicircular center C of the tip part toward the outermost P direction of the tip part, and the adhesive layer 100 was stretched at a rate of 20 m/min.

FIG. 3 (C) shows that the stretched adhesive layer 100 was broken and then separated from the substrate-free adhesive tape, and shows the breaking distance d at this time.

The release film was fixed on the outer surface of the tip part of the jig having a semicircular tip part with a radius of 22.5 mm, and the breaking distance of the adhesive layer was measured by stretching the adhesive layer at a rate of 20 m/min from the semicircular center of the tip part toward the outermost P direction of the tip part. At this time, the case where the breaking distance of the adhesive layer was 110 mm or less was represented as ○, and the case where the breaking distance of the adhesive layer was more than 110 mm was represented as X.

2. Measurement of Tensile Strength

In the process of measuring the breaking performance according to the experimental example above, the tensile strength of the adhesive layer was calculated by determining the maximum value of the tensile strength measured with AR-1000 tester (manufacturer: Cheminstruments Inc.) from the time when the adhesive layer starts to be stretched until it breaks.

3. Measurement of Rolling Ball Tack

FIG. 4 schematically illustrates a method for measuring the rolling ball tack of the adhesive layer according to ASTM D3121. An iron ball having a diameter of 11.1 mm and a weight of 5.6 g was placed at a height of 65 mm on an inclined surface having an inclination angle θ of 21°, and the distance d1 traveled by the iron ball on the adhesion layer by rolling the iron ball on the adhesion layer 100 of the substrate-free adhesive tapes produced in the examples and comparative examples above was measured.

4. Measurement of Transfer Characteristics

In order to measure transfer characteristics of the substrate-free transfer tapes according to the examples and comparative examples, an experiment was performed as follows.

A PET film having dimensions of 300 mm×400 mm and a thickness of 50 μm as the adherend was fixed onto the bottom surface of the equipment.

Further, a substrate-free adhesive tape cut into a width of 60 mm and a length of 200 mm was prepared, and then about 70 mm of a surface on one end of an exposed adhesive layer was attached to one end of the PET film.

Then, transfer characteristics of the adhesive layer were evaluated by using a roller with a load of 2 kg to attach the adhesive layer to the PET film and simultaneously remove the release film. Specifically, 50 mm the release film was peeled off from the attached 70 mm area, wound around the rear part of the roller, and held so as to be removable, and then the adhesive layer was attached to the adherend at a rate of 7.5 m/min and the release film was simultaneously peeled off from the adhesive layer.

The transfer characteristics were measured at 23° C. and 18° C., respectively. In this instance, the case where the adhesive layer was transferred to the PET film surface which is the adherend was evaluated as ○, the case where the number of residues was 2 or less was evaluated as Δ, and the case where the adhesive layer remained on the release film without being attached to the PET film was evaluated as .X.

5. Measurement of High-Temperature Holding Force

An adhesive layer cut to a size of 1 inch in width and 1 inch in length was provided between two SUS304 bars, and pressed with a weight of 6 kg for 30 seconds. The adhesive layer was attached between the two SUS304 bars to prepare a laminate.

After that, the laminate was erected perpendicular to the ground, and then one SUS304 bar was fixed to a support and a weight of 500 g was suspended on another SUS304 bar. The distance that the SUS304 bar attached to the adhesive layer at a temperature condition of 85° C. traveled downward from the initial position was measured.

6. Measurement of Release Peel Force of Finished Product

A substrate-free transfer tape sample was taken to have a width of 25.4 mm× a length of 300 mm or more, and a PET film having a thickness of 50 μm was attached to the front surface of the sample by reciprocating a roller with a load of 2 kg twice at a rate of 10 mm/s.

The PET film and the attached sample were cut to a width of 25.4 mm× a length of 300 mm, and the light peel surface was fixed to the upper end of the travelling plate of an AR-1000 tester (manufacturer: Cheminstruments Inc.) using double-sided tape. After about a half of the PET film at one end was peeled off and fixed to a jig, force when the adhesive layer transferred to the PET film was peeled off from the release paper was measured by peeling off the heavy peel surface at an angle of 180 degrees and a rate of 0.3 m/min or 2.4 m/min, thereby measuring the release peel force of the finished product.

breaking performance was measured, the phenomenon in which the adhesive layer was detached from the Paper Liner and stretched was observed, while the Paper Liner D used in Comparative Example 6 had a high release peel force, and when the transfer characteristics were measured, the adhesive layer did not adhere to the PET film and remained on the release film, and thereby transfer was impossible.

Therefore, when using a paper liner with proper release peel force, it was confirmed that satisfactory breaking performance and transfer characteristics were satisfied.

EXPLANATION OF REFERENCE NUMERALS AND SYMBOLS

| 100: Adhesive layer | 200: Release film |
|---|---|
| 300: Jig | 310: Tip part |
| 400: Adherend | |

TABLE 1

| | | Paper Liner A | | Paper Liner B | | Paper Liner C | | Paper Liner D | |
|---|---|---|---|---|---|---|---|---|---|
| | [g/in] | | | | | | | | |
| | Measurement speed | Light peel surface | Heavy peel surface | Light peel surface | Heavy peel surface | Light peel surface | Heavy peel surface | Light peel surface | Heavy peel surface |
| Release peel force of finished product | 0.3 m/min | 20.9 | 26.1 | 17.0 | 22.1 | 10.2 | 17.5 | 16.3 | 50.4 |
| | 2.4 m/min | 20.0 | 46.5 | 17.6 | 39.2 | 17.8 | 27.4 | 17.8 | 79.9 |
| Release peel force of Tesa7475 | 0.3 m/min | 9.8 | 11.3 | 10.8 | 12.4 | 7.2 | 10.2 | 10.9 | 30.1 |
| | 2.4 m/min | 12.4 | 31.9 | 13.5 | 30.8 | 12.1 | 27.3 | 15.3 | 54.0 |

TABLE 2

| | Breaking performance (110 m) | Tensile strength (gf/60 mm) | Rolling ball tack (mm) | Transfer characteristics 23° C. | Transfer characteristics 18° C. | High-temperature holding force (mm) |
|---|---|---|---|---|---|---|
| Example 1 | ○ | 78.3 | 11 | ○ | ○ | 1.0 |
| Example 2 | ○ | 88.0 | 20 | ○ | Δ | 2.0 |
| Example 3 | ○ | 91.3 | 18 | ○ | Δ | 2.0 |
| Example 4 | ○ | 67.2 | 9 | ○ | Δ | 2.5 |
| Example 5 | ○ | 118.2 | 19 | ○ | ○ | 1.5 |
| Comparative Example 1 | X | 121.4 | 30 or more | X | X | 3.5 |
| Comparative Example 2 | X | 133.1 | 26 | Δ | X | Detach |
| Comparative Example 3 | X | 150.6 | 26 | X | X | Detach |
| Comparative Example 4 | X | 149.7 | 30 or more | X | X | 0.5 |
| Comparative Example 5 | X | 89.2 | 20 | ○ | ○ | 1.5 |
| Comparative Example 6 | ○ | 127.3 | 19 | X | X | 1.5 |

From the results seen in Table 2, it could be confirmed that the substrate-free transfer tapes of Examples 1 to 5 were excellent in breaking performance and transfer characteristics, and thus they had shear characteristics suitable for the continuous process, and also had excellent adhesive force and high temperature properties.

Meanwhile, the Paper Liner C used in Comparative Example 5 had a low release peel force, and when the

The invention claimed is:

1. A substrate-free adhesive tape comprising a release film, and an adhesive layer provided on one surface of the release film and the adhesive layer containing a cured product of an adhesive composition,
wherein when the release film is fixed on the outer surface of a semicircular tip part of a jig, the semicircular tip part having a radius of 22.5 mm, a breaking distance of the adhesive layer is 110 mm or less when the adhesive layer is stretched at a rate of 20 m/min from a semicircular center of the semicircular tip part toward an outermost direction of the semicircular tip part,
wherein the adhesive composition includes an acrylic copolymer obtained by copolymerization of a monomer mixture containing:
an alkyl group-containing (meth)acrylate monomer;
a cycloalkyl group-containing (meth)acrylate monomer;
a heterocycloalkyl group-containing (meth)acrylate monomer;
a polar group-containing (meth)acrylate monomer; and
2-(2-ethoxyethoxy)ethylacrylate,
wherein the one surface of the release film is a heavy peel surface, and the other surface of the release film is a light peel surface,
wherein the heavy peel surface of the release film is in contact with the adhesive layer,
wherein a release peel force of the heavy peel surface of the release film is 25 g/in or more and less than 54 g/in at the time of peeling off tesa 7475 tape which is a reference tape at a rate of 2.4 m/min, and wherein the release peel force of the heavy peel surface of the release film is measured as follows:
the reference tape (tesa 7475) with a width of 25.4 mm x a length of 150 mm is attached to the heavy peel surface of the release film by reciprocating a roller with a load of 2 kg twice at a rate of 10 mm/s, aging is performed for 24 hours and then peel strengths at 180 degrees are measured at a rate of 2.4 m/min by using an AR-1000 tester.

2. The substrate-free adhesive tape according to claim 1, wherein the adhesive layer has a travelling distance of 25 mm or less traveled by a ball measured according to ASTM D3121.

3. The substrate-free adhesive tape according to claim 1, wherein the adhesive layer has a thickness of 10 μm or more and 80 μm or less.

4. The substrate-free adhesive tape according to claim 1, wherein a content of the polar group-containing (meth) acrylate monomer is 3 parts by weight or more and 7 parts by weight or less based on 100 parts by weight of the monomer mixture.

5. The substrate-free adhesive tape according to claim 1, wherein a content of the alkyl group-containing (meth) acrylate monomer is 50 parts by weight or more and 75 parts by weight or less based on 100 parts by weight of the monomer mixture.

6. The substrate-free adhesive tape according to claim 1, wherein a content of the cycloalkyl group-containing (meth) acrylate monomer is 5 parts by weight or more and 15 parts by weight or less based on 100 parts by weight of the monomer mixture.

7. The substrate-free adhesive tape according to claim 1, wherein a content of the heterocycloalkyl group-containing (meth)acrylate monomer is 2 parts by weight or more and 7 parts by weight or less based on 100 parts by weight of the monomer mixture.

8. The substrate-free adhesive tape according to claim 1, wherein the acrylic copolymer has a weight average molecular weight of 800,000 g/mol or more and 1,200,000 g/mol or less.

* * * * *